United States Patent [19]

Inaba et al.

[11] 4,160,805

[45] Jul. 10, 1979

[54] BOILER CONTAINING DENITRATOR

[75] Inventors: Hideya Inaba; Toshio Tatsumi; Chihiro Iwai, all of Osaka, Japan

[73] Assignee: Hitachi Shipbuilding & Engineering Co. Ltd., Osaka, Japan

[21] Appl. No.: 815,539

[22] Filed: Jul. 14, 1977

[51] Int. Cl.² .................... B01J 8/02; C01B 21/00
[52] U.S. Cl. ........................ 422/180; 60/39.18 B; 60/39.5; 122/4 D; 422/173; 422/183; 423/239
[58] Field of Search .......... 23/288 F, 288 FC, 277 R, 23/262; 423/239; 122/4 D; 60/39.18 B, 39.5; 422/173, 177, 180, 183

[56] References Cited

U.S. PATENT DOCUMENTS

| | | | |
|---|---|---|---|
| 3,053,049 | 9/1962 | Blaskowski | 60/39.18 B X |
| 3,687,115 | 8/1972 | Bell | 122/4 D |
| 3,939,097 | 2/1976 | Takeoka et al. | 252/464 |
| 4,003,711 | 1/1977 | Hishinuma et al. | 23/288 F |
| 4,012,488 | 3/1977 | Brocoff | 423/239 X |
| 4,044,102 | 8/1977 | Muraki et al. | 23/288 F X |

*Primary Examiner*—Joseph Scovronek

[57] ABSTRACT

In a boiler having a plurality of heat exchanger stages such as a superheater, an evaporator and a preheater, disposed in a combustion gas channel between heat exchangers including an optimum catalytic reaction temperature region are a denitration catalyst layer crossing said channel and a reductant feeding device for adding a reductant such as ammonia gas at a point a little short of catalyst layer. The denitration catalyst layer comprises a number of plate-like catalyst bodies whose plate surfaces extend along the direction of flow of gas, and desirably it is honey-comb-shaped. If the boiler is a waste heat boiler, the denitration catalyst layer will be disposed between the superheater and the evaporator.

7 Claims, 5 Drawing Figures

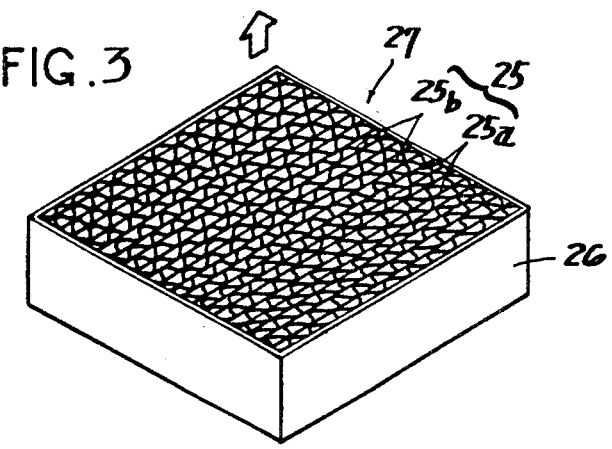
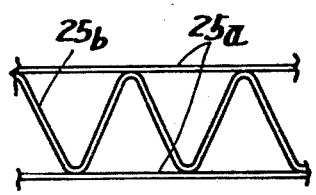
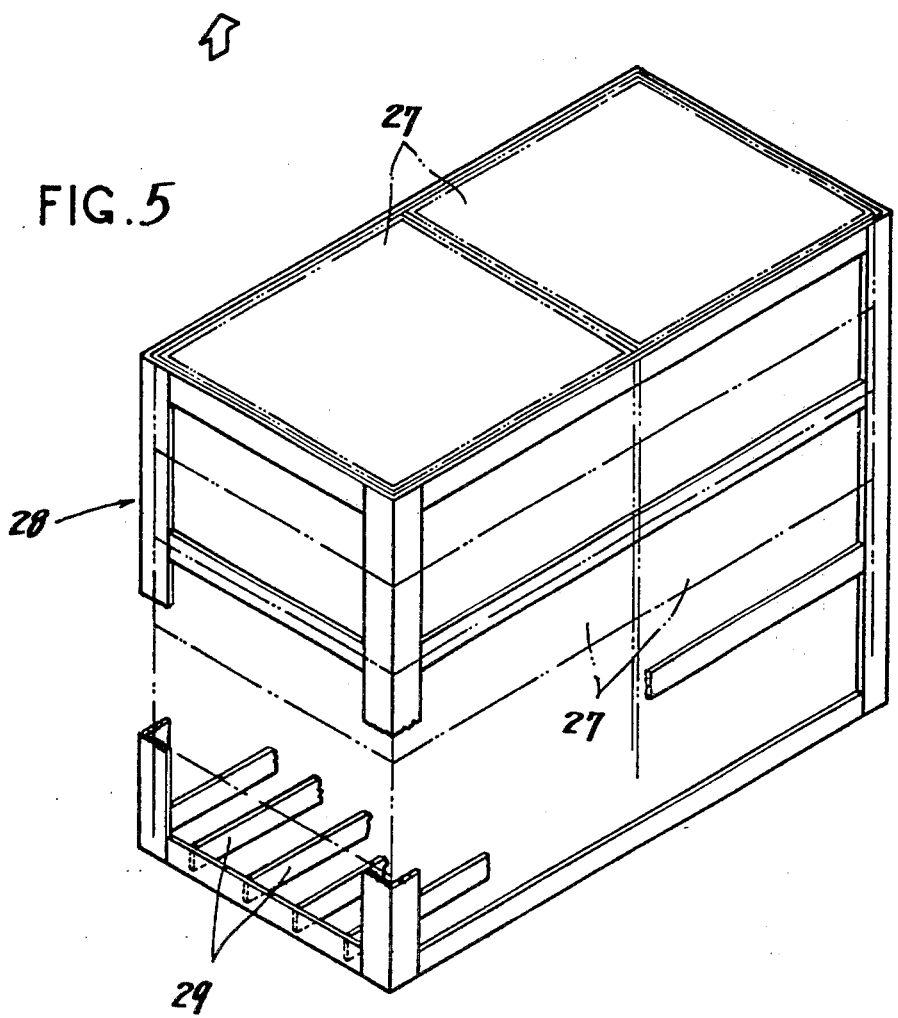

BOILER CONTAINING DENITRATOR

The present invention relates to a boiler containing a denitrator, and more particularly it relates to a boiler internally equipped with a reactor for reducing and removing nitrogen oxides contained in combustion gas.

Various combustion devices having boilers or waste heat boilers have a denitrator attached thereto for removing nitrogen oxides containing in exhaust gas. Conventionally, such denitrator is disposed downstream of a dust collector, i.e., in the flue immediate upstream of a chimney. With this arrangement, however, since the temperature of the exhaust gas introduced into the denitrator is too low to cause denitration, it has been necessary to provide said denitrator with a temperature raising furnace and a rotary heat exchanger.

More particularly, the present invention relates to a denitrator which operates on the basis of dry type smoke denitrator which is one of the methods of removing nitrogen oxides ($NO_x$) from exhaust gas. Of these methods, one based on a reaction with ammonia expressed by the following formula is most effective.

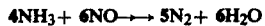

$$4NH_3 + 6NO \longrightarrow 5N_2 + 6H_2O$$

Such reaction for denitration as exemplified by the above formula is caused by the action of a catalyst and the properties of such catalyst are the most important factor. Optimum reaction temperatures for such catalysts mostly are within a range of 350°–500° C. On the other hand, the temperature of exhaust gas from a boiler exit is about 200° C., which accounts for the necessity of providing a denitrator with means for raising waste gas temperature as described above.

Further, since the catalysts used in conventional denitrators are in the form of pellets, the construction is such that the catalyst layer is liable to have soot in exhaust gas collected thereon. For this reason, it has been necessary to install the denitrator downstream of the dust collector, as described above, and hence it cannot be helped that the temperature of exhaust gas becomes further decreased.

Further, since the catalyst is in the form of pellets, no matter how much the catalyst layer is spread to reduce the thickness, it has been necessary to use a blower or the like since the pressure loss due to the catalyst layer is high. Further, this has been a cause of the denitrator having to be separately installed.

The present invention has been accomplished by noting the fact that in the combustion gas channel in a boiler there is without exception a region where the temperature conditions are most suited for reduction of nitrogen oxides. The principal object of the invention is to install a denitration catalyst layer and, if necessary, means for feeding a reductant such as ammonia in said region having the optimum temperature conditions rearwardly of one of a plurality of heat exchangers in a combustion gas channel, thereby making it possible to remove nitrogen oxides without providing a temperature raising furnace, a rotary heat exchanger, a blower and a catalyst-layer-filled container, thereby reducing floor space for installation and saving cost of construction.

A second object of the invention is to provide a boiler containing a denitration catalyst layer, wherein said catalyst layer comprises a number of plate-like denitration catalyst bodies disposed with their plate surfaces extending along the direction of flow of combustion gas, desirably said plate-like denitration catalyst bodies being assembled in a honey comb fashion. The use of such plate-like catalyst bodies minimizes pressure loss and soot collection and facilitates soot blowing, which brings about the fact that no trouble will be caused even if the catalyst layer is not disposed rearwardly of the dust collector.

Another object of the invention is to provide a denitrator contained in a boiler, wherein said plate-like catalyst bodies are assembled as a unit block body in a box whose two opposed surfaces facing in the direction of gas flow are open, such unit block bodies being combined to form said catalyst layer. Formation of catalyst layer and maintenance, control and replacement of catalyst are very easy.

A further object of the invention is to provide a waste heat boiler containing such a denitrator as described above, specifically a waste heat boiler into which waste gas from a gas turbine is introduced, said denitrator catalyst layer and, if necessary, reductant feeding means being disposed between a superheater and an evaporator.

Other numerous features and merits of the invention will be readily understood from the following description of a preferred embodiment of the invention given with reference to the accompanying drawings.

FIG. 3 is a perspective view of a catalyst unit block body;

FIG. 4 is an enlarged plan view of a part of the block body; and

FIG. 5 is a perspective view of a catalyst container into which block bodies will be assembled.

Figure 1:
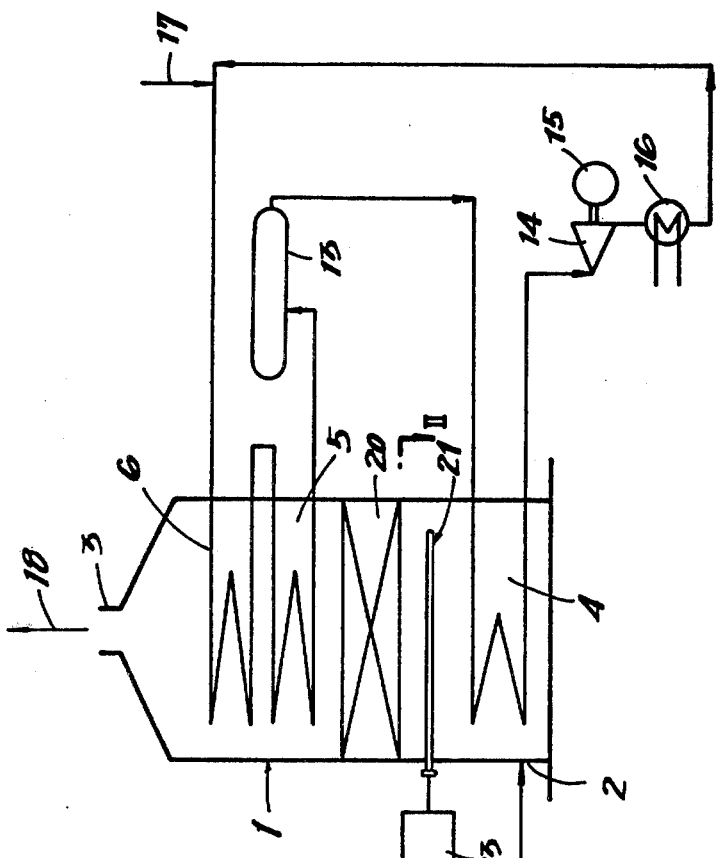
FIG. 1 is a schematic view showing the outline of the construction of a waste heat boiler which is a type of boiler with which the invention is concerned, and also showing a preferred manner of use thereof.

Referring to FIG. 1, the numeral 1 designates a waste heat boiler shown as an example of one of various boilers. The lower end of said boiler is formed with a combustion gas inlet 2 and the upper end with an outlet 3 to a flue 18. Disposed inside said boiler, from bottom upward, are a superheater 4, an evaporator 5 and an economizer 6, in the order mentioned. Connected to the combustion gas inlet 2 is a waste gas channel 8 from a gas turbine, for example, in an electric power station, and in this case, the heat exchangers are usually so designed that combustion gas may have a temperature of about 650° C. when entering the superheater 4, about 300° C. when entering the evaporator 5 and about 200° C. when entering the economizer 6. Therefore, it follows that the optimum reaction temperature region for the catalyst exists between the superheater 4 and the evaporator 5. The numeral 9 designates a compressor for the gas turbine 7; 10, a naphtha supplying device; 11, a turbine; and 12 designates an electric generator connected to the output shaft of the turbine 11. The heat exchangers 4, 5 and 6 in said waste heat boiler 1 are used for additional electric power generation by recovered heat. More particularly, there are provided an accumulator 13, a steam turbine 14 having its output shaft connected to a electric generator 15, and a steam condenser 16, and these units and said superheater 4, evaporator 5 and economizer 6 are connected together in the manner shown in FIG. 1 to constitute a heat cycle engine. Designated at 17 is a water replenishing pipe.

Figure 2:
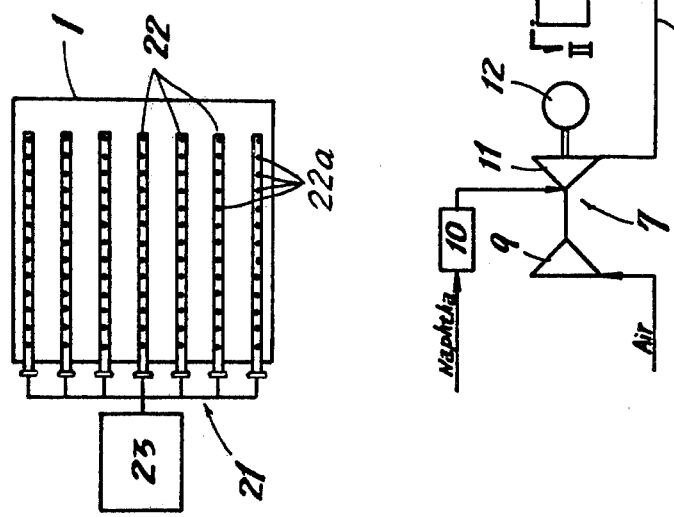
FIG. 2 is a sectional view taken along the line II—II of FIG. 1.

In the waste heat boiler 1 constructed in the manner described above, a denitration catalyst layer 20 is provided between the superheater 4 and the evaporator 5, and ammonia feeding means 21 for adding ammonia, which is a reductant, to combustion gas is provided upstream of said denitration catalyst layer 20, i.e., on the superheater 4 side. The ammonia feeding means 21, as shown in FIG. 2, comprises a plurality of injection pipes 22 extending into the gas channel of the waste heat boiler 1, and an ammonia supply unit 23 disposed outside the gas channel. The injection pipes 22 are each formed with a number of injection ports 22a, whereby ammonia can be uniformly added to waste gas. Further, the unit 23 comprises an ammonia gas bomb, replacing means and a pressure adjusting device therefor, and a gas leakage preventing device.

The denitration catalyst layer 20 is constituted by a number of plate-like denitration catalyst bodies disposed with their plate surfaces extending along the direction of flow of combustion gas. In a desired flow, as shown in FIGS. 3 and 4, there is used a honey-comb-shaped catalyst 25 which is a combination of plate-like catalyst bodies 25a and corrugated catalyst bodies 25b. Further, in this embodiment, said catalyst 25 is formed into a unit block body 27 by being built in a box 26 whose two opposed surfaces facing in the direction of flow of gas are open, as shown. A predetermined number of such unit block bodies 27 are assembled into a framework 28 having support grids 29 at the lower end, and such frameworks 28 are arranged longitudinally, transversely and vertically on a support frame in the waste heat boiler 1, thereby constituting the catalyst layer 20.

As for said catalyst 25, those described in the U.S. Patent application Ser. No. 699,472, now U.S. Pat. No. 4,040,981, issued Aug. 9, 1977, and modifications thereof are desirable, but the present invention is not concerned with the composition of such catalyst itself and hence catalysts known per se and catalysts of new compositions may be used.

According to the arrangement described above, since the denitration catalyst layer 20 and ammonia feeding means 21 are disposed between the superheater 4 and the evaporator 5, i.e. in an optimum catalytic reaction temperature region there is no need to use a temperature raising furnace, rotary heat exchanger and catalyst-layer-filled container, and further, by forming the catalyst layer 20 using plate-like catalyst bodies, pressure loss in the catalyst layer is minimized and hence it is not necessary to use a separate blower for the denitrator. Further, even if the catalyst layer 20 is formed inside the boiler 1, there is no trouble. Moreover, this construction decreases the tendency of soot to collect thereon and facilitates soot blowing. Further, by forming a catalyst into a unit block body 27 and combining such unit block bodies to form a catalyst layer, formation, exchange, maintenance and control of the catalyst layer are greatly facilitated.

In the description of the embodiment, the boiler has been described as a waste heat boiler, specifically a waste heat boiler using waste gas from a gas turbine. The essence of the invention, however, lies in the formation of a catalyst layer, specifically a catalyst layer consisting of plate-like catalyst bodies in an optimum catalytic reaction temperature region in a combustion gas channel, and, therefore, the invention is not limited to a waste heat boiler but is applicable to other boilers. Further, the denitration has been described as a reaction with ammonia, which is most effective, but the invention is applicable to other reactions for denitration employing other reductants such as carbon monoxide, hydrogen gas, methane gas and other hydrocarbons and corresponding catalysts. For example, catalysts described in the U.S. Pat. No. 3,939,097 and modifications thereof may be used. Further, the reductant used in CO, $H_2$ or a hydrocarbon or combination thereof which is to be fed by the reductant feeding means. Further, in the case of such reductants, instead of feeding such reductants by said feeding means, it is possible to have them initially included in the combustion gas in the boiler as by means for causing incomplete combustion, in which case the reductant feeding means can be omitted.

What we claim is:

1. In a waste heat boiler having a superheater, an evaporator and an economizer disposed in a combustion gas channel formed therein, the improvement comprising, a denitration catalyst layer disposed between said superheater and said evaporator, said catalyst layer being constituted by a number of plate-like denitration catalyst bodies disposed with their plate surfaces extending along the direction of flow of combustion gas, and reductant feeding means for adding a reductant to the combustion gas provided between said catalyst layer and said superheater.

2. A boiler as set forth in claim 1, wherein said plate-like denitration catalyst bodies are combined in a honeycomb form.

3. A boiler as set forth in claim 1, wherein said plate-like denitration catalyst bodies are assembled into a box whose two opposed surfaces facing in the direction of flow of gas are open, to form a unit block body, said catalyst layer consisting of a combination of such unit block bodies.

4. A boiler as set forth in claim 1, wherein said reductant feeding means comprises a plurality of injection pipes extending into the gas channel and each having a number of reductant injecting ports, and a reductant feeding unit disposed outside the gas channel and communicating with said injection pipes.

5. A boiler as set forth in claim 1, including a source of ammonia gas to be added as a reductant to the combustion gas by the reductant feeding means as aforesaid.

6. A boiler as set forth in claim 1, including a source of CO, $H_2$ or a hydrocarbon or combination thereof to be added as a reductant to the combination gas by said reductant feeding means as aforesaid.

7. A boiler as set forth in claim 1, including means for feeding said waste heat boiler with waste gas from a gas turbine.

* * * * *